United States Patent
Wood et al.

(10) Patent No.: US 6,604,889 B1
(45) Date of Patent: Aug. 12, 2003

(54) SLUICE GATE WALL THIMBLE

(76) Inventors: Jeffrey A. Wood, 2396 Ravenna Blvd., Unit 101, Naples, FL (US) 34109; Colin W. Bennett, 524 6th Concession Road West, Flamborough, Ontario (CA), L0R 1V0

( * ) Notice: Subject to any disclaimer, the term of this patent is extended or adjusted under 35 U.S.C. 154(b) by 0 days.

(21) Appl. No.: 09/497,271

(22) Filed: Feb. 3, 2000

(51) Int. Cl.[7] .................. E02B 7/20; F16B 37/14
(52) U.S. Cl. ............... 405/88; 405/90; 411/373; 411/374; 411/431
(58) Field of Search ............... 405/88, 89, 90; 411/372.5, 372.6, 373, 374, 431, 910

(56) References Cited

U.S. PATENT DOCUMENTS

| | | | |
|---|---|---|---|
| 4,028,896 A | * 6/1977 | Whipps | 405/104 |
| 4,147,451 A | * 4/1979 | Zeiders | 405/90 |
| 4,220,420 A | * 9/1980 | Aston et al. | 405/104 |
| 4,265,564 A | * 5/1981 | Watelet | 405/105 |
| 4,524,950 A | * 6/1985 | Vitas et al. | 251/326 |
| 4,540,322 A | * 9/1985 | Coffia | 411/338 |
| 4,561,472 A | * 12/1985 | Dreyer et al. | 138/94.3 |
| 5,141,361 A | * 8/1992 | Fontaine | 405/106 |
| 5,590,992 A | * 1/1997 | Russell | 411/431 |
| 5,752,795 A | * 5/1998 | D'Adamo | 411/429 |
| 6,053,683 A | * 4/2000 | Cabiran | 411/372.6 |
| 6,135,691 A | * 10/2000 | Nadarajah et al. | 411/431 |
| 6,213,683 B1 | * 4/2001 | Muramatsu | 405/115 |

FOREIGN PATENT DOCUMENTS

| | | | | |
|---|---|---|---|---|
| DE | 3642537 A1 | * 6/1988 | | F16B/33/06 |
| JP | 354150548 A | * 11/1979 | | F16B/37/14 |

* cited by examiner

*Primary Examiner*—David Bagnell
*Assistant Examiner*—Jennifer H Gay
(74) *Attorney, Agent, or Firm*—Merrill N. Johnson

(57) ABSTRACT

A sluice-gate wall thimble has a support stem (1, 12) which covers an embedment side of a sluice-gate nut (2) and is fixable to a wall anchor (5, 11). The sluice-gate nut is inside threaded and fixable to an embedment side (16) of a predetermined sluice-gate wall (7) with an axis of the sluice-gate nut being in line concentrically with an axis of a wall-bolt aperture (8) on the predetermined sluice-gate wall. A plurality of the support stems on a plurality of the sluice-gate nuts in line with a plurality of the wall-bolt apertures and fixed to at least one wall anchor are employed first to prevent encroachment of fluid concrete (3) or other foundation material onto inside-diameter threading (4) of the plurality of sluice-gate nuts during construction of a predetermined sluice gate. Then after construction of the predetermined sluice gate, the plurality of support stems are employed to anchor the predetermined sluice-gate wall to the concrete or other foundation material throughout a long and reliable life of sluice-gate-wall attachment to the sluice-gate nuts.

11 Claims, 2 Drawing Sheets

SLUICE GATE WALL THIMBLE

FIELD OF THE INVENTION

1. Field of the Invention.

This invention relates to fastener-nut covers with extensions that are referred to as thimbles which provide structural support and which protect internal threading of the fastener nuts against entry of fluid concrete that is poured to position sluice-gate walls.

BACKGROUND OF THE INVENTION

2. Relation to prior art.

Attachment of metal walls of sluice gates to concrete ends of pipes and other conveyances of fluid to and from containers and reservoirs for achieving adequate structural integrity, reliability and endurance of sluice-gating has long been a problem. A major aspect of the problem is preventing entry of fluid concrete into fastener nuts that are affixed to sluice-gate walls before they are cemented into position. There are known thimbles made of cast iron for covering affixed gate-wall fastener nuts, but they do not provide structural support and do not protect adequately against encroachment of fluid concrete onto fastener threading.

SUMMARY OF THE INVENTION

In light of problems that have continued to exist in this field, objects of patentable novelty and utility taught by this invention are to provide a sluice-gate wall thimble which:

- prevents encroachment of fluid cement onto threads of affixed sluice-gate fasteners during cementing construction;
- provides structural integrity, reliability and endurance of sluice-gate structure;
- is adaptable to a wide selection of sluice-gate structures;
- is inexpensive to produce; and
- is convenient and inexpensive to use.

This invention accomplishes these and other objectives with a sluice-gate wall thimble having a support stem which covers an embedment side of a wall-fastener nut and is fixable to a wall anchor. The wall-fastener nut is inside-threaded and fixable to an embedment side of a predetermined sluice-gate wall with an axis of the wall-fastener nut being in line concentrically with an axis of a wall-bolt aperture on the predetermined sluice-gate wall.

A plurality of the support stems on a plurality of the wall-fastener nuts in line with a plurality of the wall-bolt apertures and fixed to at least one wall anchor are employed first to prevent encroachment of fluid concrete or other foundation material onto inside threading of the plurality of wall-fastener nuts during construction of a predetermined sluice gate. Then after construction of the predetermined sluice gate, the plurality of support stems are employed to anchor the predetermined sluice-gate wall to the concrete or other foundation material throughout a long and reliable life of sluice-gate-wall attachment to the wall-fastener nuts.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Figure 1:
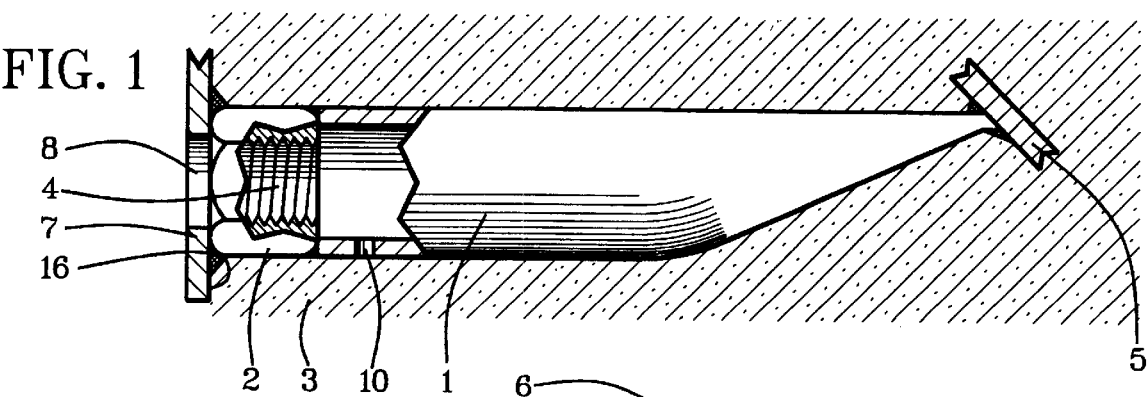
FIG. 1 is a partially cutaway side view of a sluice-gate wall thimble having a tubular support stem with an enclosed anchor section fixed to a sluice-gate anchor that is a water-stop collar.
Figure 2:
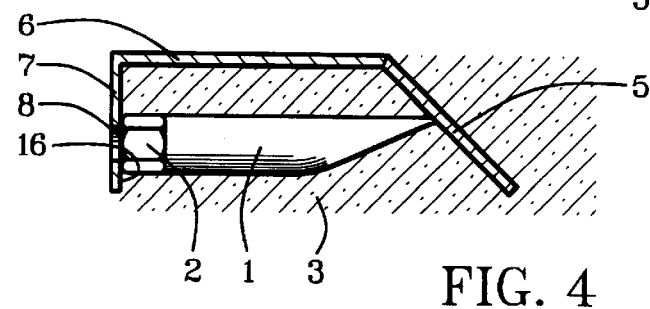
FIG. 2 is a side view of the sluice-gate wall thimble illustrated in FIG. 1 in relation to a cross section of a sluice gate taken through section line 3 of FIG. 3.

Listed numerically below with reference to the drawings are terms used to describe features of this invention. These terms and numbers assigned to them designate the same features throughout this description.

| | |
|---|---|
| 1. Tube | 9. Wall bolt |
| 2. Sluice-gate nut | 10. Vent orifice |
| 3. Concrete | 11. Attachment appendage |
| 4. Inside-diameter threads | 12. Rod |
| 5. Water-stop collar | 13. Rod threads |
| 6. Enclosure walls | 14. Bolt threads |
| 7. Sluice-gate wall | 15. Outside edges |
| 8. Wall-bolt aperture | 16. Embedment side |

Reference is made first to FIGS. 1–4. A support stem such as a tube 1 has a thread-cover section with a thread cover structured and positioned proximate an embedment end of a sluice-gate nut 2 to prevent embedment-side entrance of thread contaminant such as concrete 3 onto inside-diameter threads 4 of the sluice-gate nut 2. An anchor section of the tube 1 is fixed to a sluice-gate anchor such as a water-stop collar 5 that is extended at a predetermined angle towards a center of a sluice-gate enclosure having enclosure walls 6 from which a sluice-gate wall 7 is extended orthogonally.

Figure 7:
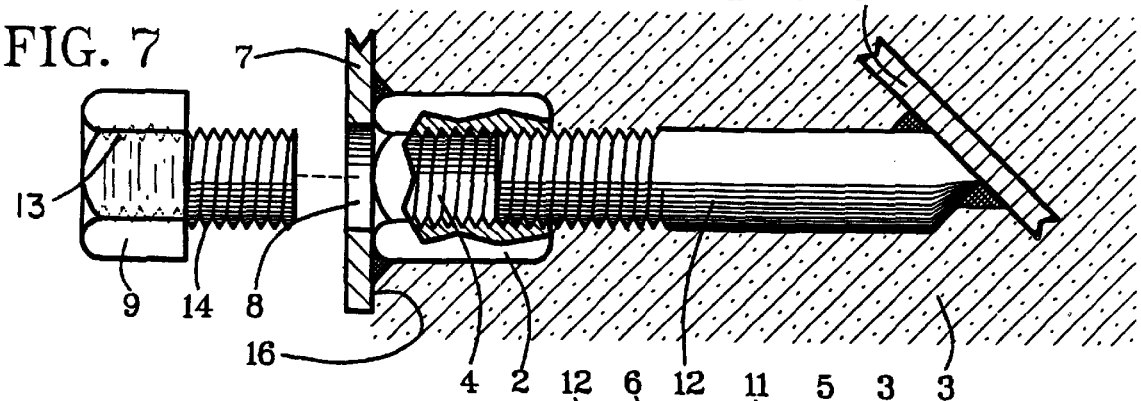
FIG. 7 is a side view of a sluice-gate wall thimble having a stem that is a rod with a nut-connector end screwed into the sluice-gate nut having a length of inside-diameter threads to accommodate a wall bolt in addition to the nut-connector end of the rod which has an anchor section fixed to the water-stop collar and shown embedded in concrete.

The sluice-gate nut 2 and its inside-diameter threads 4 have an axis that is in line concentrically with an axis of a wall-bolt aperture 8 through which a wall bolt 9 shown in FIG. 7, can be inserted for being screwed into the inside-diameter threads 4. The sluice-gate nut 2 is welded or otherwise fixed to an embedment side of the sluice-gate wall 7. At least one vent orifice 10 in a bottom of the tube 1 is optional.

Figure 3:
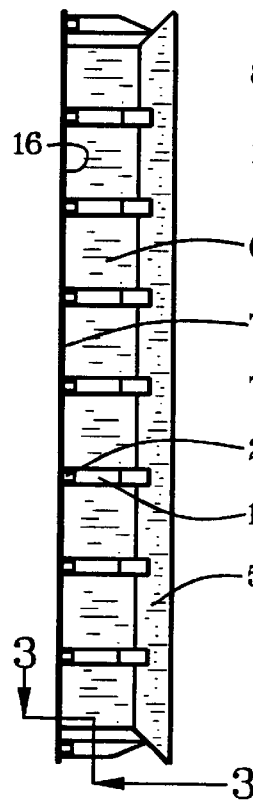
FIG. 3 is a side view of a plurality of sluice-gate wall thimbles with tubular support stems on a sluice-gate wall having a sluice-gate enclosure with enclosure walls to which the water-stop collar is extended at a predetermined angle and to which anchor sections of the sluice-gate wall thimbles are fixed.
Figure 4:
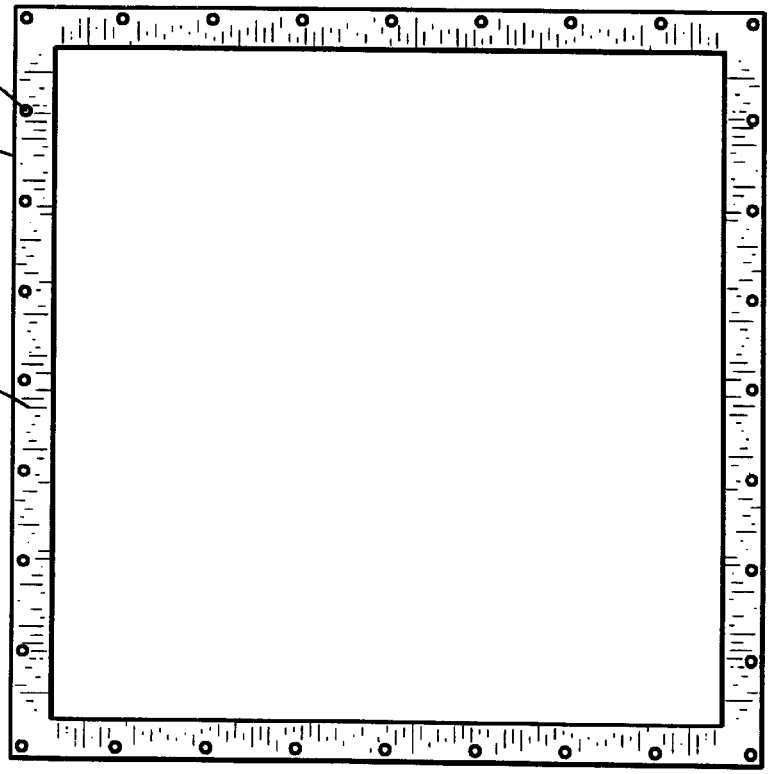
FIG. 4 is a front view of a sluice-gate wall with sluice-gate-bolt orifices for concentric attachment of sluice-gate wall thimbles on an embedment side.
Figure 8:
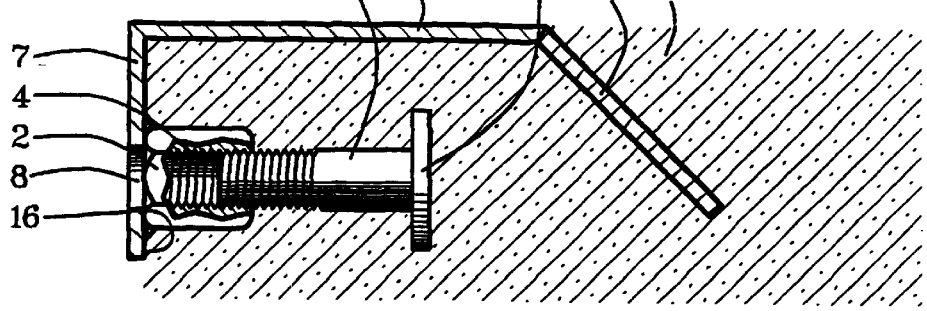
FIG. 8 is a side view of a sluice-gate wall thimble having a stem that is a rod with a nut-connector end screwed into the sluice-gate nut having a length of inside-diameter threads to accommodate a wall bolt in addition to the nut-connector end of the rod which has an anchor section fixed to an attachment appendage and shown embedded in concrete.
Figure 9:
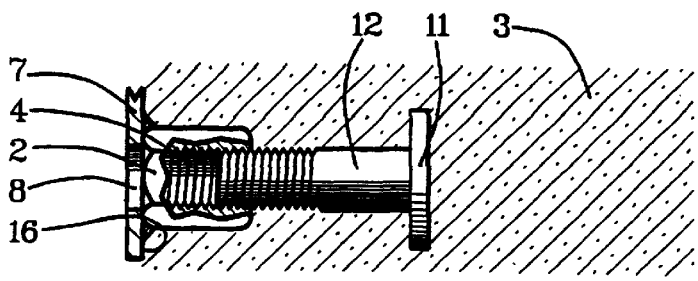
FIG. 9 is the FIG. 8 illustration shown in relationship to a sluice-gate wall not having a sluice-gate enclosure and a water-stop collar.

As illustrated in FIGS. 3–4, a plurality of wall-bolt apertures 8 in a sluice-gate wall 7 can be provided with a matching plurality of sluice-gate wall thimbles having support stems that are tubes 1 or other type of support stems such as shown in FIGS. 7–9. The sluice-gate wall 7 can be square as shown, otherwise polygonal or round for predetermined sluice gates.

The sluice-gate wall thimble is synergistic. It prevents entry of fluid concrete 3 or other contaminant onto the inside-diameter threads 4 during constructional concreting embedment and it provides structural integrity to sluice gates. It reinforces the concrete 3 and stabilizes the sluice-gate wall against pressures which tend to pull it away from the concrete 3. Hence the characterization of support stem for a tube 1 and for other support-stem configurations.

Figure 5:
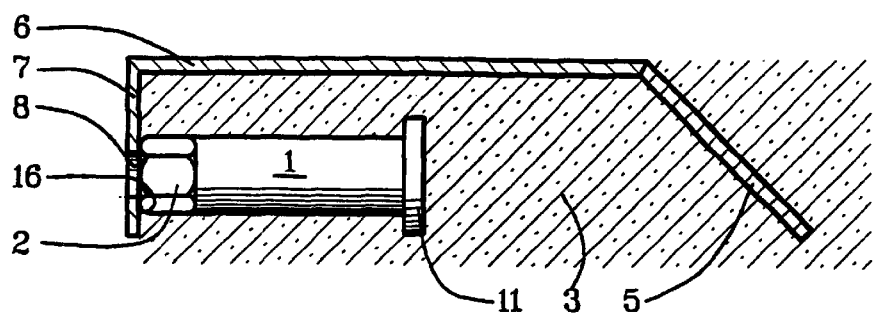
FIG. 5 is a side view of a sluice-gate wall thimble having a tubular support stem with an anchor section fixed to a sluice-gate anchor that is an attachment appendage and shown embedded in concrete on an embedment side of a sluice-gate wall having a water- stop collar.
Figure 6:
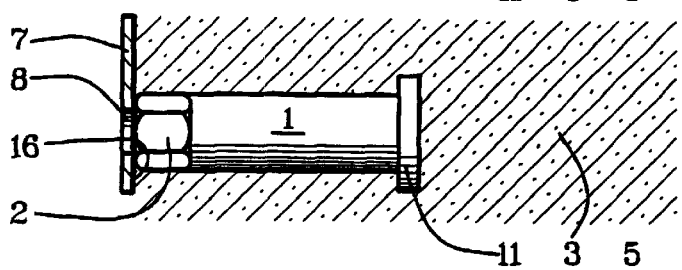
FIG. 6 is a side view of a sluice-gate wall thimble having a tubular support stem with an anchor section fixed to a sluice-gate anchor that is an attachment appendage and shown embedded in concrete on an embedment side of a sluice-gate wall not having a stop collar.

Referring to FIGS. 1 and 5–6, the sluice-gate anchor can be an attachment appendage 11 extended laterally from the anchor section of the support stem such as the tube 1. The attachment appendage 11 can be a closure for the tube 1 as an option to impingement or other closure. The sluice-gate wall 7 on which a plurality of sluice-gate wall thimbles are employed can have enclosure walls 6 as shown in FIG. 5 or it can be attached only to the concrete 3 as shown in FIG. 6.

Referring to FIGS. 1 and 7–9, the support stem can be a rod 12 and the sluice-gate anchor can be the water-stop collar 5 as depicted in FIG. 7 or the attachment appendage 11 as depicted in FIGS. 8–9, regardless of whether or not the sluice gate has a water-stop collar 5. The rod 12 can cover the inside-diameter threads 4 by threading attachment to the sluice-gate nut 2 having sufficient length to accommodate rod threads 13 on a nut connector end in addition to bolt threads 14 on the wall bolt 9.

Use of this sluice-gate wall thimble differs for fixing of the support stem tube 1 or rod 12 to sluice-gate anchors such as the water-stop collar 5 and the attachment appendage 11. Fixing to the water-stop collar 5 is accomplished after the sluice-gate wall thimble is in place. Fixing to the attachment appendage 11 is accomplished prior to fixing the sluice-gate wall thimble on the sluice-gate nut 2.

Referring to FIGS. 1–9, steps for either are to first structure a plurality of wall-bolt apertures 8 at predetermined distances from outside edges 15 of a sluice-gate wall 7. Next is fixing a matching plurality of sluice-gate nuts 2 on an embedment side 16 of the sluice-gate wall 7 with axes of the inside-diameter threads 4 of the sluice-gate nuts 2 in line concentrically with axes of inside peripheries of the wall-bolt apertures 8. Next is attaching thread-cover sections of the support stems to the sluice-gate nuts 2. For using attachment appendages 11, fixing them to the support stems precedes this step. For using the water-stop collar 5, fixing it to the support stems follows this step. Finally, is embedding the support stem and the sluice-gate anchor employed into a concrete gate-support base by pouring concrete 3 within predetermined concrete forms proximate the embedment side 16 of the sluice-gate wall 7.

Preferably, the sluice-gate wall thimble is made of a stainless metal such 304 stainless steel which is widely available in useable forms. However, it can be made of any of a wide selection of alloys containing rust-resistant metals such as nickel and/or chrome.

A new and useful sluice-gate wall thimble having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A sluice-gate wall thimble comprising:
    a support stem having an anchor section extended from a thread-covered section;
    the thread cover section having a thread cover structured and positioned proximate an embedment end of a sluice-gate nut
    the sluice-gate nut being attached to a sluice-gate wall having a wall-bolt aperture with an axis concentric to an axis of the inside-diameter threads of the sluice-gate nut; and the anchor section being fixable to a sluice-gate anchor wherein the sluice-gate wall thimble wherein the sluice-gate anchor is a water-stop collar extended at a predetermined angle from a sluice-gate enclosure having enclosure walls from which the sluice-gate wall is extended orthogonally.

2. The sluice-gate wall thimble of claim 1 wherein:
    the support stem is a tube with an inside periphery larger than an inside periphery of the sluice-gate nut; and the anchor section is closed to entry of the thread contaminant and is affixed to the water-stop collar.

3. The sluice-gate wall thimble of claim 1 wherein:
    the sluice-gate nut has a thread length from-end-to-end of the inside-diameter threads to accommodate threading attachment of a wall bolt within the length of the sluice-gate threads without extension of the wall bolt completely through the sluice-gate nut;
    the support stem is a rod with an outside periphery at least equal to the inside periphery of the inside-diameter threads;
    the thread-cover section is affixed to the embedment end of the sluice-gate nut; and the anchor section is affixed to the water-stop collar.

4. The sluice-gate wall thimble of claim 1 wherein:
    the sluice-gate nut has a thread length from end-to-end of its inside-diameter threads,
    the thread length of the sluice-gate nut from-end-to-end of the inside-diameter threads is sufficient to accommodate threading attachment of a wall bolt within the length of the inside-diameter threads in addition to accommodating threading attachment of nut-connector threads which are outside-diameter threads on the thread-cover section of the support stem;
    the nut-connector threads are screwed a predetermined distance into the sluice-gate nut; and
    the anchor section of the support stem is affixed to the water-stop collar.

5. The sluice-gate wall thimble of claim 4 wherein:
    the support stem is a rod with at least a nut-connector end having outside-diameter threads to match the inside-diameter threads of the sluice-gate nut.

6. The sluice-gate wall thimble of claim 1 wherein:
    the sluice-gate anchor is at least one attachment appendage extended laterally from the anchor section of the support stem.

7. The sluice-gate wall thimble of claim 6 wherein:
    the support stem is tubular with an inside periphery larger than an inside periphery of the sluice-gate nut; and
    the anchor section is closed to entry of the thread contaminant and is affixed to the attachment appendage.

8. The sluice-gate wall thimble of claim 6 wherein:

the sluice-gate nut has a thread length from end-to-end of its inside-diameter threads, the thread length of the sluice-gate nut from end-to-end of the inside-diameter threads is sufficient to accommodate threading attachment of a wall bolt within the length of the inside-diameter threads without extension of the wall bolt completely through the sluice-gate nut;

the support stem is a rod with an outside periphery at least equal to the inside periphery of the inside-diameter threads;

the thread-cover section is affixed to the embedment end of the sluice-gate nut; and the anchor section is affixed to the attachment appendage.

9. The sluice-gate wall thimble of claim 6 wherein:

the sluice-gate nut has a thread length from end-tp-end of its inside-diameter thread, the thread length of the sluice-gate nut from-end-to-end of the inside-diameter threads is sufficient to accommodate threading attachment of a wall bolt within the length of the inside-diameter threads in addition to accommodating threading attachment of nut-connector threads which are outside-diameter threads on the thread-cover section of the support stem;

the nut-connector threads are screwed a predetermined distance into the sluice-gate nut; and the anchor section of the support stem is affixed to the attachment appendage.

10. The sluice-gate wall thimble of claim 9 wherein:

the support stem is a rod with at least a nut-connector end having outside-diameter threads to match the inside-diameter threads of the sluice-gate nut.

11. A method for using a sluice-gate wall thimble comprising:

a support stem having an anchor section extended from a thread-cover section;

the thread-cover section having a thread cover structured and positioned proximate an embedment end of a sluice-gate nut to prevent embedment-side entrance of thread contaminant onto inside-diameter threads of the sluice-gate nut;

the sluice-gate nut being attached to a sluice-gate wall having a wall-bolt aperture with an axis concentric to an axis of the inside-diameter threads of the sluice-gate nut; the anchor section being fixable to a sluice-gate anchor; and the sluice-gate anchor is a water-stop collar extended at a predetermined angle towards a center of a sluice-gate enclosure having enclosure walls from which the sluice-gate wall is extended orthogonally towards the center of the sluice-gate enclosure;

the method comprising the following steps:

(a) structuring a plurality of wall-bolt apertures at predetermined distances from outside edges of the sluice-gate wall;

(b) fixing a matching plurality of sluice-gate nuts on an embedment side of the sluice-gate wall with axes of inside-diameter threads of the sluice-gate nuts in line concentrically with axes of inside peripheries of the wall-bolt apertures;

(c) attaching thread-cover sections of the support stems to the sluice-gate nuts;

(d) attaching the anchor sections of the support stems to the sluice-gate anchor; and (e) embedding the support stem and the sluice-gate anchor into a concrete gate-support base by pouring concrete within predetermined concrete forms proximate the embedment side of the sluice-gate wall.

\* \* \* \* \*